(12) United States Patent
Chatterjee et al.

(10) Patent No.: US 8,321,556 B1
(45) Date of Patent: Nov. 27, 2012

(54) METHOD AND SYSTEM FOR COLLECTING DATA ON A WIRELESS DEVICE

(75) Inventors: Manjirnath Chatterjee, San Francisco, CA (US); Roderick Swift, Walnut Creek, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1359 days.

(21) Appl. No.: 11/825,933

(22) Filed: Jul. 9, 2007

(51) Int. Cl.
| | |
|---|---|
| G06F 15/173 | (2006.01) |
| G06F 7/00 | (2006.01) |
| G06F 17/30 | (2006.01) |
| G06F 17/00 | (2006.01) |
| H04H 60/21 | (2008.01) |
| H04H 60/33 | (2008.01) |
| H04H 60/61 | (2008.01) |
| H04M 11/00 | (2006.01) |

(52) U.S. Cl. ........ 709/224; 707/804; 715/234; 715/237; 455/2.01; 455/405

(58) Field of Classification Search .................. 709/224; 707/804; 715/234, 237; 455/2.01, 405
See application file for complete search history.

(56) References Cited

U.S. PATENT DOCUMENTS

| | | |
|---|---|---|
| 4,099,591 A | 7/1978 | Carr |
| 4,973,952 A | 11/1990 | Malec et al. |
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kansakoski et al. |
| 5,233,642 A | 8/1993 | Renton |
| 5,241,534 A | 8/1993 | Omuro et al. |
| 5,287,266 A | 2/1994 | Malec et al. |
| 5,319,638 A | 6/1994 | Lin |
| 5,345,392 A | 9/1994 | Mito et al. |
| 5,444,745 A | 8/1995 | Ali-Vehmas |
| 5,483,468 A * | 1/1996 | Chen et al. .................... 702/186 |

(Continued)

FOREIGN PATENT DOCUMENTS

JP 11259422 9/1999

(Continued)

OTHER PUBLICATIONS

Jain et al. "Congestion Avoidance in Computer Networks With a Connectionless Network Layer," Digital Equipment Corporation, Copyright 1988, Version: Jun. 1, 1997 (21 pages).

(Continued)

*Primary Examiner* — George C Neurauter
(74) *Attorney, Agent, or Firm* — Hanley, Flight and Zimmerman, LLC

(57) ABSTRACT

A method of storing collected data on a wireless device. User interaction with a wireless device and/or the performance of the wireless device is monitored and data related thereto collected. The collected data may be structured into a tagged hierarchical structure comprising a plurality of events that are separate and independent from one another. Each event may describe a specific application with a plurality of attributes. The tagged hierarchical structure formed as a tree structure is translated into a syntax generic language. The result may be formed into a compact format using a zipped format and/or a binary-equivalent format and then stored and transmitted to a central location (e.g., a server) for statistical analysis processing. The server transforms the received data into expanded format and forms a hierarchical tree structure for each event and its attributes. The result is processed for producing a statistical analysis of the collected data.

20 Claims, 18 Drawing Sheets

U.S. PATENT DOCUMENTS

| | | | |
|---|---|---|---|
| 5,497,373 | A | 3/1996 | Hulen et al. |
| 5,521,907 | A | 5/1996 | Ennis, Jr. et al. |
| 5,603,095 | A | 2/1997 | Uola |
| 5,642,353 | A | 6/1997 | Roy, III et al. |
| 5,675,510 | A | 10/1997 | Coffey et al. |
| 5,692,215 | A | 11/1997 | Kutzik et al. |
| 5,799,154 | A | 8/1998 | Kuriyan |
| 5,859,838 | A | 1/1999 | Soliman |
| 5,978,657 | A | 11/1999 | Suzuki |
| 5,987,306 | A | 11/1999 | Nilsen et al. |
| 5,999,908 | A | 12/1999 | Abelow |
| 6,091,956 | A | 7/2000 | Hollenberg |
| 6,108,637 | A | 8/2000 | Blumenau |
| 6,115,680 | A | 9/2000 | Coffee et al. |
| 6,353,929 | B1 | 3/2002 | Houston |
| 6,397,256 | B1 | 5/2002 | Chan et al. |
| 6,470,386 | B1 | 10/2002 | Combar et al. |
| 6,480,497 | B1 | 11/2002 | Flammer, III et al. |
| 6,516,189 | B1 | 2/2003 | Frangione et al. |
| 6,526,413 | B2 * | 2/2003 | Schwitters et al. ........... 707/621 |
| 6,581,025 | B2 | 6/2003 | Lehman |
| 6,587,835 | B1 | 7/2003 | Treyz et al. |
| 6,606,605 | B1 | 8/2003 | Kolls |
| 6,647,269 | B2 | 11/2003 | Hendrey et al. |
| 6,697,944 | B1 | 2/2004 | Jones et al. |
| 6,745,011 | B1 * | 6/2004 | Hendrickson et al. ..... 455/67.11 |
| 6,754,470 | B2 * | 6/2004 | Hendrickson et al. ..... 455/67.11 |
| 6,757,543 | B2 * | 6/2004 | Moran et al. ............... 455/456.1 |
| 6,763,458 | B1 | 7/2004 | Watanabe et al. |
| 6,807,515 | B2 | 10/2004 | Vogel et al. |
| 6,816,886 | B2 | 11/2004 | Elvanoglu et al. |
| 6,834,308 | B1 | 12/2004 | Ikezoye et al. |
| 6,837,436 | B2 | 1/2005 | Swartz et al. |
| 6,840,861 | B2 | 1/2005 | Jordan et al. |
| 6,883,168 | B1 | 4/2005 | James et al. |
| 6,912,507 | B1 | 6/2005 | Phillips et al. |
| 6,920,550 | B2 | 7/2005 | Des li |
| 6,928,280 | B1 | 8/2005 | Xanthos et al. |
| 6,968,178 | B2 | 11/2005 | Pradhan et al. |
| 6,973,491 | B1 | 12/2005 | Staveley et al. |
| 7,010,107 | B1 | 3/2006 | Lee et al. |
| 7,013,136 | B2 | 3/2006 | Frangione et al. |
| 7,072,640 | B2 | 7/2006 | Bernhart |
| 7,127,261 | B2 | 10/2006 | Van Erlach |
| 7,149,549 | B1 | 12/2006 | Ortiz et al. |
| 7,155,210 | B2 | 12/2006 | Benson |
| 7,171,157 | B2 | 1/2007 | Lee |
| 7,194,758 | B1 | 3/2007 | Waki et al. |
| 7,206,647 | B2 | 4/2007 | Kumar |
| 7,209,473 | B1 | 4/2007 | Mohaban et al. |
| 7,227,498 | B2 | 6/2007 | Soliman |
| 7,319,847 | B2 | 1/2008 | Xanthos et al. |
| 7,356,590 | B2 | 4/2008 | Wilson et al. |
| 7,474,645 | B2 | 1/2009 | Lundin |
| 7,479,899 | B2 | 1/2009 | Horstemeyer |
| 7,504,966 | B2 | 3/2009 | Horstemeyer |
| 7,523,191 | B1 | 4/2009 | Thomas et al. |
| 7,548,915 | B2 | 6/2009 | Ramer et al. |
| 7,551,922 | B2 | 6/2009 | Roskowski et al. |
| 7,555,571 | B1 | 6/2009 | Skinner |
| 7,561,069 | B2 | 7/2009 | Horstemeyer |
| 7,609,650 | B2 * | 10/2009 | Roskowski et al. ........... 370/252 |
| 7,623,823 | B2 | 11/2009 | Zito et al. |
| 7,680,802 | B2 | 3/2010 | Kato |
| 7,689,521 | B2 * | 3/2010 | Nodelman et al. ............... 706/21 |
| 7,693,817 | B2 * | 4/2010 | Dumais et al. ......... 707/999.002 |
| 7,742,762 | B1 | 6/2010 | Biere et al. |
| 7,756,829 | B2 * | 7/2010 | Bhanote ........................ 707/634 |
| 7,949,677 | B2 | 5/2011 | Croft et al. |
| 7,954,150 | B2 | 5/2011 | Croft et al. |
| 8,010,679 | B2 | 8/2011 | Low et al. |
| 8,014,726 | B1 | 9/2011 | Petersen et al. |
| 8,051,180 | B2 | 11/2011 | Mazzaferri et al. |
| 2001/0028301 | A1 | 10/2001 | Geiger et al. |
| 2001/0047291 | A1 | 11/2001 | Garah et al. |
| 2002/0002504 | A1 | 1/2002 | Engel et al. |
| 2002/0025795 | A1 | 2/2002 | Sharon et al. |
| 2002/0046090 | A1 | 4/2002 | Stewart |
| 2002/0069037 | A1 | 6/2002 | Hendrickson et al. |
| 2002/0112048 | A1 | 8/2002 | Gruyer et al. |
| 2002/0160758 | A1 | 10/2002 | Pradhan et al. |
| 2003/0054757 | A1 | 3/2003 | Kolessar et al. |
| 2003/0115586 | A1 | 6/2003 | Lejouan et al. |
| 2003/0177488 | A1 | 9/2003 | Smith et al. |
| 2004/0260470 | A1 | 12/2004 | Rast |
| 2005/0136903 | A1 | 6/2005 | Kashima et al. |
| 2005/0144632 | A1 | 6/2005 | Mears et al. |
| 2005/0155019 | A1 * | 7/2005 | Levine et al. .................. 717/127 |
| 2005/0216509 | A1 | 9/2005 | Kolessar et al. |
| 2005/0216844 | A1 | 9/2005 | Error et al. |
| 2006/0004627 | A1 | 1/2006 | Baluja |
| 2006/0019723 | A1 | 1/2006 | Vorenkamp et al. |
| 2006/0218533 | A1 * | 9/2006 | Koduru et al. ................ 717/124 |
| 2006/0270475 | A1 | 11/2006 | Frangione et al. |
| 2006/0294225 | A1 | 12/2006 | Grecco et al. |
| 2007/0011040 | A1 | 1/2007 | Wright et al. |
| 2007/0038516 | A1 | 2/2007 | Apple et al. |
| 2007/0260475 | A1 * | 11/2007 | Bhanote ........................... 705/1 |
| 2007/0288277 | A1 | 12/2007 | Neuhauser et al. |
| 2007/0288476 | A1 | 12/2007 | Flanagan et al. |
| 2007/0294057 | A1 | 12/2007 | Crystal et al. |
| 2007/0294132 | A1 | 12/2007 | Shang et al. |
| 2007/0294705 | A1 | 12/2007 | Gopalakrishnan et al. |
| 2007/0294706 | A1 | 12/2007 | Neuhauser et al. |
| 2008/0002677 | A1 * | 1/2008 | Bugenhagen et al. ........ 370/356 |
| 2008/0076506 | A1 | 3/2008 | Nruyen et al. |
| 2008/0126420 | A1 | 5/2008 | Wright et al. |
| 2008/0140479 | A1 | 6/2008 | Mello et al. |
| 2010/0030785 | A1 | 2/2010 | Wilson et al. |
| 2010/0205301 | A1 | 8/2010 | Ansari et al. |
| 2011/0321035 | A1 | 12/2011 | Petersen et al. |

FOREIGN PATENT DOCUMENTS

| | | |
|---|---|---|
| WO | 02073885 | 9/2002 |
| WO | 02098029 | 12/2002 |
| WO | 2006098414 | 9/2006 |

OTHER PUBLICATIONS

Balakrishnan et al. "A Comparison of Mechanisms for Improving TCP Performance over Wireless Links," ACM SIGCOMM '96, Stanford, CA, Aug. 1996 (14 pages).

Vucetic et al., "Network Management Applications for Wireless Local Loop," Electrotechnical Conference, May 1998, vol. 2 (pp. 787-791).

Ko, Y.F. "Automatic Call Generation and Analysis-Network Testing and Cellularsurvey Tools," Making Life Easier—Network Design and Management Tools (Digest No: 1996/217), Oct. 10, 1996 (pp. 7/1-7/6).

Patent Cooperation Treaty, "Written Opinion of the International Searching Authority," issued by the International Searching Authority in connection with international counterpart PCT application No. PCT/US2008/056282, mailed Aug. 21, 2008, 5 pages.

Patent Cooperation Treaty, "International Search Report," issued by the International Searching Authority in connection with international counterpart PCT application No. PCT/US2008/056282, mailed Aug. 21, 2008, 5 pages.

Wagner, David P. Battelle, Report Lexington Area Travel Data Collection Test; GPA for Personal Travel Surveys. Final Report for Office of Highway Information Management, Office of Technology Application, and Federal Highway Administration, Sep. 1997, 92 pages.

Patent Cooperation Treaty, "International Search Report," issued by the International Searching Authority in connection with related PCT application No. PCT/US2007/080235, mailed Aug. 25, 2008, 4 pages.

Patent Cooperation Treaty, "Written Opinion of the International Searching Authority," issued by the International Searching Authority in connection with related PCT application No. PCT/US2007/080235, mailed Aug. 25, 2008, 6 pages.

International Bureau, International Preliminary Report on Patentability for PCT/US2007/080235, mailed Apr. 16, 2009, 8 pages.

\* cited by examiner

| EVENTS | FIRST ATTRIBUTES | SECOND ATTRIBUTES | DESCRIPTION |
|---|---|---|---|
| RADIO/ TELEVISION | | | |
| | TIME | | STARTING/ENDING TIME |
| | REFERRER | | APPLICATION LAUNCHED THROUGH CLICKING ON A LINK VERSUS LAUNCHED THROUGH APPLICATION ON THE DEVICE |
| | CHANNEL | | |
| | | NUMBER | |
| | | CALL SYMBOL | NAME OF THE STATION/CHANNEL |
| | PROGRAM | | |
| | | TITLE | |
| | | RATING | |
| | | DESCRIPTION | |
| | | DURATION | |
| | | START TIME | |
| | | END TIME | |
| | | META REFERENCE | LINK TO PROGRAM GUIDE |
| | | PUBLISHER | |
| | | AUTHOR | |
| | | PUBLICATION DATE | |
| | | COPYRIGHT | |

FIGURE 2A

| EVENTS | FIRST ATTRIBUTES | SECOND ATTRIBUTES | DESCRIPTION |
|---|---|---|---|
| STREAMING | | | |
| | TYPE | | AUDIO, VIDEO, DATA |
| | TIME | | STARTING/ENDING TIME |
| | REFERRER | | APPLICATION LAUNCHED THROUGH CLICKING ON A LINK VERSUS LAUNCHED THROUGH APPLICATION ON THE DEVICE |
| | CHANNEL | | |
| | | NUMBER | |
| | | CALL SYMBOL | NAME OF THE STATION/CHANNEL |
| | PROGRAM | | |
| | | TITLE | |
| | | RATING | |
| | | DESCRIPTION | |
| | | DURATION | |
| | | START TIME | |
| | | END TIME | |
| | | META REFERENCE | LINK TO PROGRAM GUIDE |
| | | PUBLISHER | |
| | | AUTHOR | |
| | | PUBLICATION DATE | |
| | | COPYRIGHT | |
| | PAYLOAD | | |

FIGURE 2B

| EVENTS | FIRST ATTRIBUTES | SECOND ATTRIBUTES | DESCRIPTION |
|---|---|---|---|
| SMS/MMS | | | |
| | TYPE | | SEND VS RECEIVE |
| | TIME | | STARTING/ENDING TIME |
| | FROM | | SENDER |
| | TO | | RECIPIENT |
| | PAYLOAD | | |

FIGURE 2C

| EVENTS | FIRST ATTRIBUTES | SECOND ATTRIBUTES | DESCRIPTION |
|---|---|---|---|
| EMAIL | | | |
| | TYPE | | SEND VS RECEIVE |
| | TIME | | STARTING/ENDING TIME |
| | FROM | | SENDER |
| | TO | | RECIPIENT |
| | PAYLOAD | | |
| | SUBJECT | | |
| | CC | | |
| | BCC | | |

FIGURE 2D

| EVENTS | FIRST ATTRIBUTES | SECOND ATTRIBUTES | DESCRIPTION |
|---|---|---|---|
| EMAIL | | | |
| | TYPE | | SEND VS RECEIVE |
| | TIME | | STARTING/ENDING TIME |
| | FROM | | SENDER |
| | TO | | RECIPIENT |
| | SESSION ID | | MULTIPLE MESSAGES IN A CHAT SESSION HAVE THE SAME ID |
| | PAYLOAD | | |
| | SUBJECT | | |
| | CC | | |
| | BCC | | |

FIGURE 2E

| EVENTS | FIRST ATTRIBUTES | SECOND ATTRIBUTES | DESCRIPTION |
|---|---|---|---|
| CALL | | | |
| | TYPE | | REGULAR VERSUS PUSH TO TALK VERSUS CONFERENCE |
| | CALLER ID | | |
| | NUMBER | | |
| | TIME | | |
| | SIGNAL STRENGTH | | |
| | CALL QUALITY | | |
| | MOBILE COUNTRY CODE | | |
| | MOBILE NETWORK CODE | | |
| | LOCATION AREA CODE | | |
| | CELL ID | | |
| | BASE STATION ID | | |
| | BROADCAST CONTROL CHANNEL | | |
| | Rx LEVEL | | |
| | Rx LEVEL FULL | | |
| | Rx LEVEL SUB | | |
| | Rx QUALITY | | |
| | Rx QUALITY FULL | | |
| | Rx QUALITY SUB | | |
| | IDLE TIME SLOT | | |
| | TIMING ADVANCE | | |
| | GPRS CELL ID | | |
| | GPRS BASE STATION ID | | |
| | NUMBER OF BROADCAST CONTROL CHANNEL | | |
| | GPS INFORMATION | | |

FIGURE 2F

| EVENTS | FIRST ATTRIBUTES | SECOND ATTRIBUTES | DESCRIPTION |
|---|---|---|---|
| FILE | | | |
| | FILE TYPE | | AUDIO, VIDEO, EXECUTABLE, IMAGE AND ETC. |
| | FILE EVENT TYPE | | CREATE, ACCESS, MODIFY, DELETE |
| | PATH | | FILE PATH |
| | TIME | | STARTING/ENDING TIME |
| | FILENAME | | |
| | EXTENSION | | |
| | CREATED | | DATE/TIME FILE WAS CREATED |
| | MODIFIED | | DATE/TIME FILE WAS MODIFIED |
| | ACCESSED | | DATE/TIME FILE WAS ACCESSED |
| | META REFERENCE | | |
| | SIZE | | |
| | PAYLOAD | | |
| | DURATION | | |
| | ARTIST | | |
| | FORMAT | | MP3, OGG, WAVE AND ETC |
| | TITLE | | |
| | AUDIO TYPE | | MUSIC, RINGTONE AND ETC. |
| | PUBLISHER | | |
| | AUTHOR | | |
| | PUBLICATION DATE | | |
| | COPYRIGHT | | |
| | LABLE | | |
| | ALBUM ART | | LINK TO ALBUM ART IMAGE |
| | ALBUM | | DATE/TIME FILE WAS MODIFIED |

FIGURE 2G

| EVENTS | FIRST ATTRIBUTES | SECOND ATTRIBUTES | DESCRIPTION |
|---|---|---|---|
| INTERNET URL | | | |
| | URL | | |
| | TIME | | |
| | SIZE | | |
| | CREATED | | |
| | MODIFIED | | |
| | ACCESSED | | |
| | TITLE | | |
| | PROTOCOL | | |

FIGURE 2H

| EVENTS | FIRST ATTRIBUTES | SECOND ATTRIBUTES | DESCRIPTION |
|---|---|---|---|
| DRIVE INTERACTION | | | |
| | TIME | | |
| | TRANSFERRED BYTES | | |
| | INTERACTION TYPE | | BLUETOOTH, WIFI, ZIGBEE, ACTIVESYNC and ETC. |
| | DEVICE INTERACTED WITH | | |
| | | ID | |
| | | IMEI | |
| | | MODEL | |
| | | OS | |
| | | SUBSCRIBER No. | |
| | | MANUFACTURER | |
| | | BROWSER | |

FIGURE 21

| EVENTS | FIRST ATTRIBUTES | SECOND ATTRIBUTES | DESCRIPTION |
|---|---|---|---|
| REBOTTS/ SHUTDOWN/ STARTUP | | | |
| | TIME | | |

FIGURE 2J

| EVENTS | FIRST ATTRIBUTES | SECOND ATTRIBUTES | DESCRIPTION |
|---|---|---|---|
| CLICK STREAM | | | KEY STROKE ENTRY |
| | TIME | | |
| | PAYLOAD | | SEQUENCE OF ONE OR MORE KEYCODES WITH EACH KEYPRESS HAVING ITS OWN EVENT |

FIGURE 2K

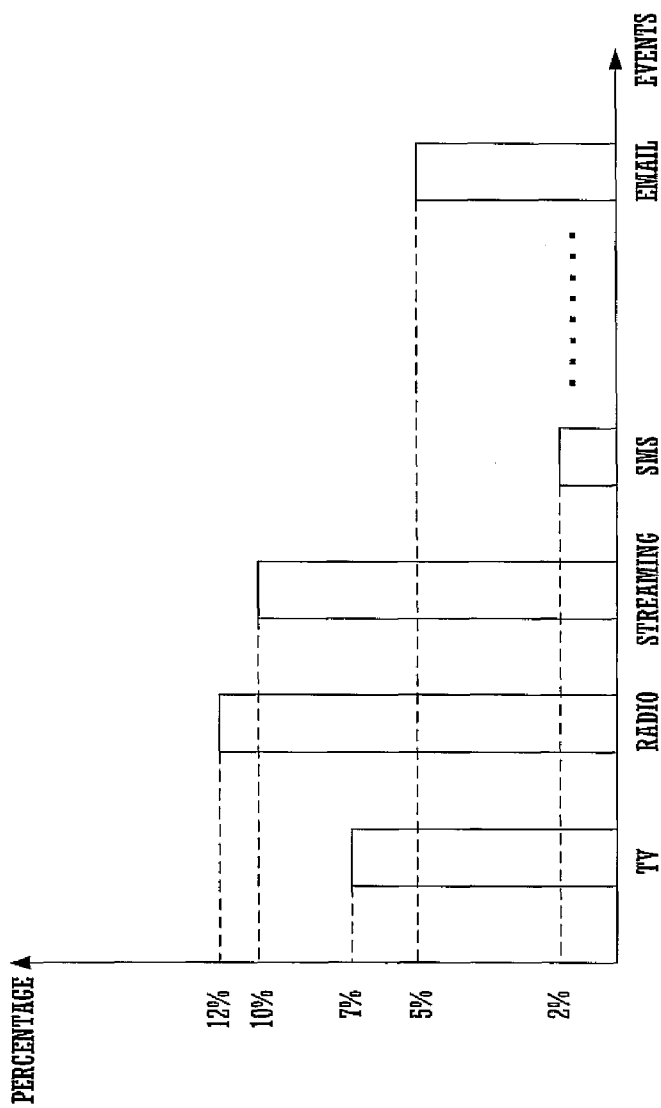

METHOD AND SYSTEM FOR COLLECTING DATA ON A WIRELESS DEVICE

TECHNICAL FIELD

The embodiments of the present invention relate to the field of data collection on a wireless device. More particularly, embodiments of the present invention relate to a method and system for collecting data in a structured format for efficient storage and easy reproduction.

BACKGROUND ART

The increasing number of wireless devices (e.g., cellular phones, laptops, Blackberrys™, personal digital assistants (PDAs), IPods™, etc.) has increased the need to monitor their use for various purposes. For example, monitoring user interaction with a wireless device provides visibility as to the type of services and applications that may interest a user. Similarly, monitoring the performance of a wireless device enables manufacturers, service providers, content providers, etc. to improve their products and services.

Monitoring the performance of a wireless device allows a manufacturer, service provider, content provider, etc. to detect a potential bug in their product, services, etc., enabling them to take appropriate remedial actions. For example, monitoring a user interaction with a wireless device and detecting an error each time a user takes specific actions may alert the manufacturer of the wireless device of a potential bug in the wireless device. In another example, monitoring the user interaction with a wireless device enables content providers, application developers etc. to determine popular applications, contents and etc. As a result, content, providers, application developers, etc. can tailor their product to satisfy a need in the market as determined by monitoring user interaction and device performance.

Unfortunately, wireless devices have limited memory space to store monitoring information and data, largely due to their size and physical constraint. Accordingly, the monitored information and data on a wireless device can get lost if not transmitted immediately from the wireless device to a data depository location (e.g., a server). However, constantly transmitting the monitored information and data further limits an already limited and valuable bandwidth.

Moreover, monitored information and data are generally stored in an unstructured format. Accordingly, information is stored regardless of whether it is redundant, thereby further limiting the amount of memory space on a wireless device.

Furthermore, storing monitored information and data in an unstructured format presents additional challenges when a new application to be monitored is developed. For example, monitoring and storing information for a new application may require major changes to the metering component since the collected data is in unstructured format. In other words, unstructured format of the collected data presents major challenges to extend the scope of the metering component to a newly developed application.

In general, monitored data is not processed by the wireless device itself because wireless devices have limited processing capabilities and limited power (e.g., battery power). Accordingly, monitored data are usually transmitted to a remote location (e.g., a server) for processing. Unfortunately, transmitting data in an unstructured format is bandwidth inefficient as described above.

SUMMARY

Accordingly, a need has arisen to collect monitored data and information in a tagged structured format that is readily extensible to a newly developed application. Moreover, a need has arisen for a method and system to monitor and collect user interaction and device performance in a compact form, thereby relieving a wireless device from further memory constraints. Furthermore, a need has arisen to transmit the collected data in a bandwidth efficient manner. It will become apparent to those skilled in the art after reading the detailed description of the present invention that the embodiments of the present invention satisfy the above mentioned needs.

In one embodiment of the present invention, user interaction with a wireless device and the performance of the wireless device is monitored. For example, Internet usage, television viewing, streaming content usage, content purchases, instant messaging, etc. may be monitored. In one embodiment, the metering component resides on the wireless device. The monitored user interaction and device performance data may be collected and structured into a tagged hierarchical structure. According to one embodiment of the present invention, the tagged hierarchical structure comprises a plurality of events that are separate and independent from one another.

Each event may describe a specific application or a specific action by a user on a wireless device. For example, an event may describe television viewing, instant messaging, emailing and the like. According to one embodiment of the present invention, each event may have a plurality of attributes that describes the event. For example, one attribute may be the time when an application is launched and another attribute may be the time when the application is terminated, to name a few. It is appreciated that the attributes referred to herein are parameters/characteristics that may define an event. As such, attributes referred throughout this application differ from extensible markup language attributes (XML) that are explicitly referred to as XML attributes.

The tagged hierarchical structure is translated into a syntax generic language (e.g., XML) that contains event specific content. The tagged hierarchical structure is further designed to reduce the amount of redundant data to form a compact structure. For example, when fewer than all of the plurality of attributes and/or events is changed, only attributes that have changed are stored, thereby eliminating redundancy.

Additionally, the size of the tagged hierarchical structure data may be reduced and form a compact form by using a zipped format and/or a binary-equivalent format (e.g., binary extensible markup language (BXML), abstract syntax notation 1 (ASN.1)). Thus, a compact translated data is formed via a single central processing unit (CPU) verse.

According to one embodiment of the present invention, the translated compacted format for the tagged hierarchical data structure may be stored on the wireless device. In one embodiment, the stored information may be transmitted to a central location (e.g., a server) for statistical analysis processing.

In one embodiment, a central location (e.g., a server) may receive the tagged hierarchical data structure from a wireless device. Since the tagged hierarchical data structure is in a compact form, it is expanded by the server. Once the received data is expanded, each event forms a parent node of an independent and separate tree structure with a plurality of attributes at lower level nodes.

In one embodiment, events and/or attributes with a common feature may be linked to one another. For example, an event may be for watching a television program with its plurality of attributes including the time the television application is launched. Another event may also be for the same television application with its plurality of attributes including the time the television application is terminated. Accordingly, the information regarding the television application that remain the same are not duplicated but rather identified by a tag, thereby avoiding redundant information. As such, only the attribute that changes is identified (e.g., the time of launch and termination). As a result, various attributes and events may be linked together.

As a result of a tagged structured format, when a new application is developed it may be readily monitored and added since the remaining data structures are the same regardless of the new application. Accordingly, a new adapter for the new event may be developed and added to the metering component to monitor the new application. As such, the tagged data structure is readily extensible to newly developed applications. Moreover, since the monitored and collected user interaction and device performance data are in a compact form, the constraint to store large amounts of data on wireless devices is reduced. Furthermore, since data is formed in a tagged hierarchical structure format that is compact and with reduced amount of redundancy, transmitting data from wireless device to a central location (e.g., a server) can be achieved in a bandwidth efficient manner.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 2A-2K show exemplary events monitored by a metering component in accordance with one embodiment of the present invention.

FIGS. 5A and 5B show exemplary data analysis of the metered data in accordance with one embodiment of the present invention.

DETAILED DESCRIPTION

Figure 1:
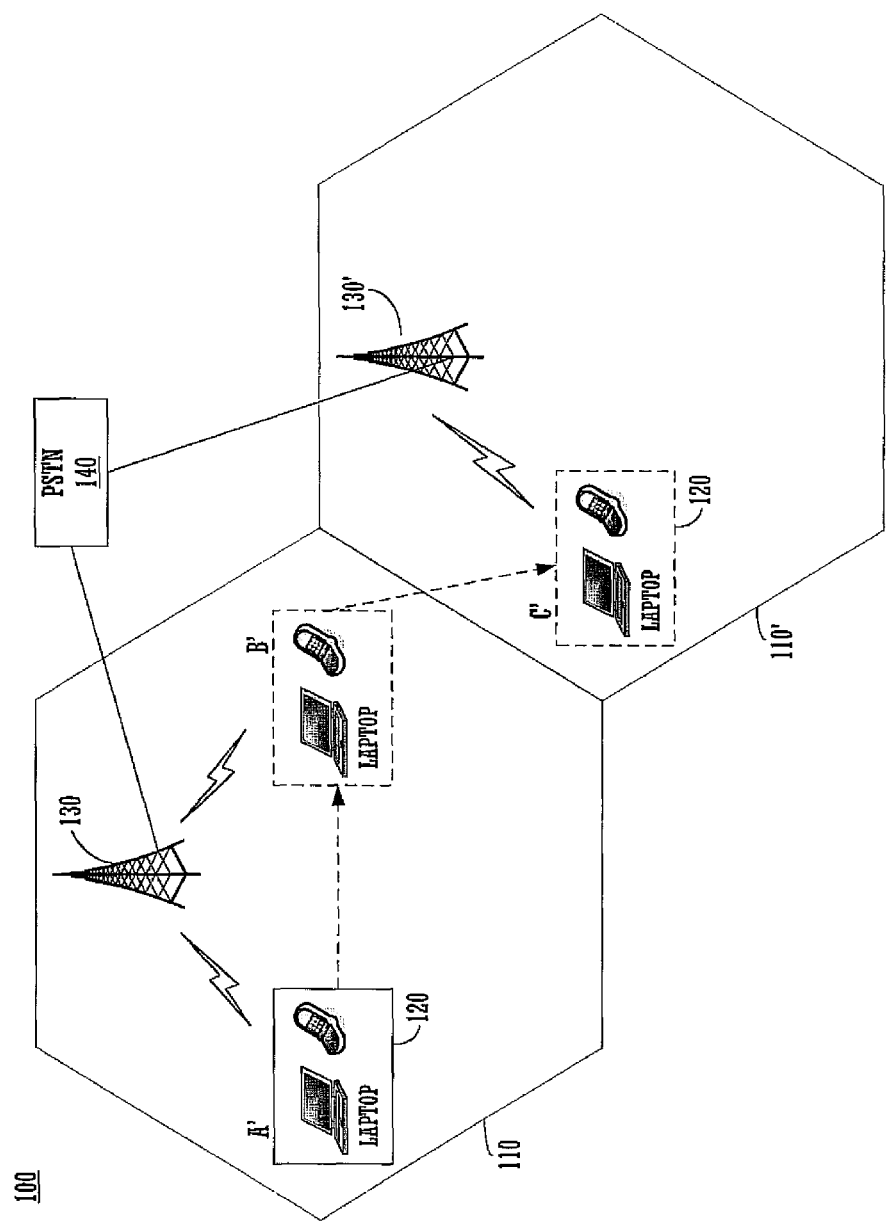
FIG. 1 shows an exemplary cellular structure for a wireless device in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or "receiving" or "sending" or "providing" or "storing" or "monitoring" or "collecting" or "structuring" or "translating" or "transmitting" or "forming" or "linking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Collecting Data on a Wireless Device

Referring now to FIG. 1, an exemplary cellular structure for a wireless device in accordance with one embodiment of the present invention is shown. System 100 shows a first wireless cellular structure 110 and a second wireless cellular structure 110'. A wireless device 120 may be a cellular phone, a laptop, a Blackberry™, a personal digital assistant (PDA), an IPod™, etc. The wireless device 120 may be in communication with a base station 130 in the cellular structure 110 that may be further coupled to a public switching telephone network (PSTN) 140.

The wireless device 120 may travel within a given wireless cellular structure 110 from a first location A' to a second location B'. Moreover, the wireless device 120 may roam between different cellular structures. For example, the wireless device 120 may travel from location B' of cellular structure 110 to location C' of cellular structure 110' and connect to a base station 130' of the new cellular structure 110'.

User interaction with the wireless device 120 may be monitored and data may be collected for statistical analysis. For example, a monitoring component may monitor the use of various events such as applications (e.g., television, Internet, email, instant messaging (IM), radio, etc.) on the wireless device 120. Monitoring user interaction with the wireless device 120 may provide valuable information to service providers, content providers, application developers, etc. For example, monitoring user interaction with the wireless device 120 may provide visibility as to the most popular applications, contents, etc. Accordingly, content providers, service providers, application developers, etc. may tailor their products to satisfy the market need.

According to one embodiment of the present invention, data regarding the wireless device 120 may also be monitored and collected. For example, the wireless device 120 information may include the model number, the manufacturer, the operating system, the subscriber number, the version number and the device identification number, to name a few.

Similarly, information and data regarding the wireless device 120 performance may also be monitored and collected. In one example, the performance parameters may include signal strength, signal interference, signal quality, dropped calls, the speed of download/upload, amount of detected error, available memory capacity on the wireless device, available power on the wireless device and the like.

According to one embodiment of the present invention, the monitoring component resides on the wireless device 120. Thus, the monitoring component monitors and collects data related to user interaction, the device itself and the wireless device performance and the like. Once data is collected, the information may be stored and later or in real time transmitted to a central depository unit (e.g., a server) for processing.

Referring now to FIGS. 2A-2K, exemplary events monitored by a metering component in accordance with one embodiment of the present invention are shown. A wireless device may comprise a plurality of different applications to be metered. Events may include applications, actions by the user, device information and performance and the like. For example, events may include various applications for metering and may include a web browser application, radio, television, streaming content, short messaging service (SMS), multimedia messaging service (MMS), email, instant messaging (IM), a telephone call, accessing a file, an Internet URL, an interaction with another device, a reboot, a shutdown, a startup, key strokes and the like. Moreover, each event may have a plurality of attributes that may define each event. It is appreciated that the attributes referred to herein are parameters/characteristics that may define an event. As such, attributes referred throughout this application differ from extensible markup language attributes (XML) that are explicitly referred to as XML attributes.

Referring now to FIG. 2A, an event for a radio/television application in accordance with one embodiment of the present invention is shown. The left most column represents an event, e.g., radio/television application. As described above, each event may be described by a plurality of attributes. Plurality of attributes provides a hierarchical structure for the event. For example, a television/radio application may have a plurality of first attributes describing the event as shown in the second column. Thus, the plurality of first attributes as shown in the second column forms a first hierarchical structure for the event. In FIG. 2A, the plurality of first attributes in the second column include the time and date that the television/radio application is launched, the method by which the application is launched (e.g., through a link, through the wireless device application, etc.), the channel watched and the program watched.

It is appreciated that each attribute may have attributes of its own, thereby forming a sub-hierarchical structure for that attribute. The third column represents second attributes that form sub-hierarchical structure for the first attributes described above. In FIG. 2A, the channel attribute may have two attributes that forms a sub-hierarchical structure. For example, the two attributes defining the channel attribute may be the channel number and the call symbol which may be the name of the channel or the station (e.g., KXWY).

Similarly, program attribute may have eleven attributes that form a sub-hierarchical structure for the program attribute. For example the program attribute may be defined by attributes such as the title of the program watched, the rating, the description, the duration, the start time and the end time, meta reference that may be the link to program guide information, the publisher, the author, the publication date, the copyright and the like, to name a few.

It is appreciated that the fourth column of FIG. 2A shows a selective description of various attributes. For example, the call symbol attribute is defined as the name of the station/channel.

Referring now to FIG. 2B, the streaming event may be similarly defined by its plurality of first and second attributes. For example, the streaming event may be identified by its type that may be audio, video, data, etc. Similarly, one of the attributes defining the streaming event may be the payload of the streaming event (e.g., raw data that comprises streaming). It is appreciated that other plurality of first attributes and plurality of second attributes of the streaming event may be similar to those of television/radio event described above.

Referring now to FIG. 2C, the SMS/MMS event may be similarly defined by a plurality of first attributes. For example, the event may be identified by its type (e.g., sent versus received), the time it was launched and terminated, the sender, the recipient and the payload.

Referring now to FIG. 2D, the email event may be defined by a plurality of first attributes. For example, the event may be identified by its type, time, sender, recipient, payload, subject, CC, BCC, etc.

Referring now to FIG. 2E, the IM event may be identified by a plurality of first attributes. For example, an IM event may be identified by it type, time, sender, recipient, session ID that may be the same for multiple messages in a chat session, payload, subject, CC, BCC and the like, to name a few.

Referring now to FIG. 2F, the call event may similarly be defined by a plurality of first attributes. For example, a call may be identified by its type (e.g., regular call versus push to talk versus a conference call). A call may be further defined by other attributes including caller ID, the number, the time, signal strength, call quality, mobile country code, mobile network code, location area code, cellular ID, base station ID, broadcast control channel that is a downlink channel to the wireless device that may provide information regarding the network, Rx level that may be the signal level, Rx quality that represents the signal quality, general packet radio service (GPRS) cellular ID, GPRS base station ID, number of broadcast control channel, global positioning service (GPS) information and the like. Other attributes include but are not limited to signal interference, dropped calls, the speed of download/upload, the amount of detected error, available memory on the device, available power on the wireless device and the like.

Referring now to FIG. 2G, accessing a file may be defined by a plurality of first attributes. For example, a file may be identified by its type (e.g., audio, video, executable, image, etc.). Moreover, a file access may be further identified by event type (e.g., creating, accessing, modifying, deleting, etc.). The path of the file may be identified and the time the file was launched and/or terminated is determined. Furthermore, the filename and the extension of the file may be identified and the time when the file was created, modified and accessed. Meta reference may link the file to meta data. The size and the payload of the file may be identified. The duration of time that the file was being used may also be identified. If the file contains artistic content, then the artist may be identified, the format of the file (e.g., MP3, OGG, wave, etc.) and the title of the content may be determined. The file event may be further defined with additional plurality of first attributes including the file type, publisher, author, publication date, copyright information, label, album art linking to the album art image and the album, to name a few.

Referring now to FIG. 2H, Internet URL event may be defined by a plurality of first attributes. For example, the URL, the time, the size, the time the URL was created/modified/accessed, the title and the protocol (e.g., HTTP) may be identified.

Referring now to FIG. 2I, the wireless device interaction event may be defined using a plurality of first and second attributes. For example, a plurality of first attributes may include the time, the amount of transferred bytes, connection type (e.g., Bluetooth, wireless fidelity (WIFI), ZIGBEE, ACTIVESYNC, etc.) and information for the device it interacts with. The information of the device the wireless device interacts with may be defined by a plurality of second attributes. The plurality of second attributes include the ID of the device the wireless interact with, the international mobile equipment identity (IMEI), the model of the device, the operating system of the device, the subscriber number of the device, the manufacturer of the device and the browser of the device and the like.

Referring now to FIG. 2J, the reboot/shutdown/startup event may be defined by the time the event was launched and terminated. Referring now to FIG. 2K, the click stream event that defines the key strokes entered by the user may be defined by the time and its payload. Payload may include a sequence of one or more keycodes with each keypress and it may have its own event.

It is appreciated that even though events of FIGS. 2A-2K are described within the content of a plurality of first and second attributes, any number of attributes may be used. For example, an event may have a plurality of third and fourth attributes. Additional attributes that may define any given event may include a GPS data, interaction with a WIFI access point and the like. As such, it is appreciated that the number of attributes described herein should not be construed as limiting the scope of the present invention.

It is further appreciated that even though certain events described herein are in relation to various specific applications, an event may encompass any occurrence. For example, an event may comprise information regarding a file, a device, a recurrence rule and the like.

In one exemplary embodiment, the event that may include information of a wireless device may have a plurality of attributes that described the wireless device. For example, the wireless device may be described by its ID, the terminal data collection protocol (TDCP) version, the IMEI, the model, the operating system, the subscribed number, the manufacturer, the metering component version and the like. Similarly, the recurrence rule event may be described by a plurality of attributes that includes the type of event of interest (e.g., television event), a recurrence attribute that identifies the frequency that events of a particular type are reported to a server and the like.

Figure 3:
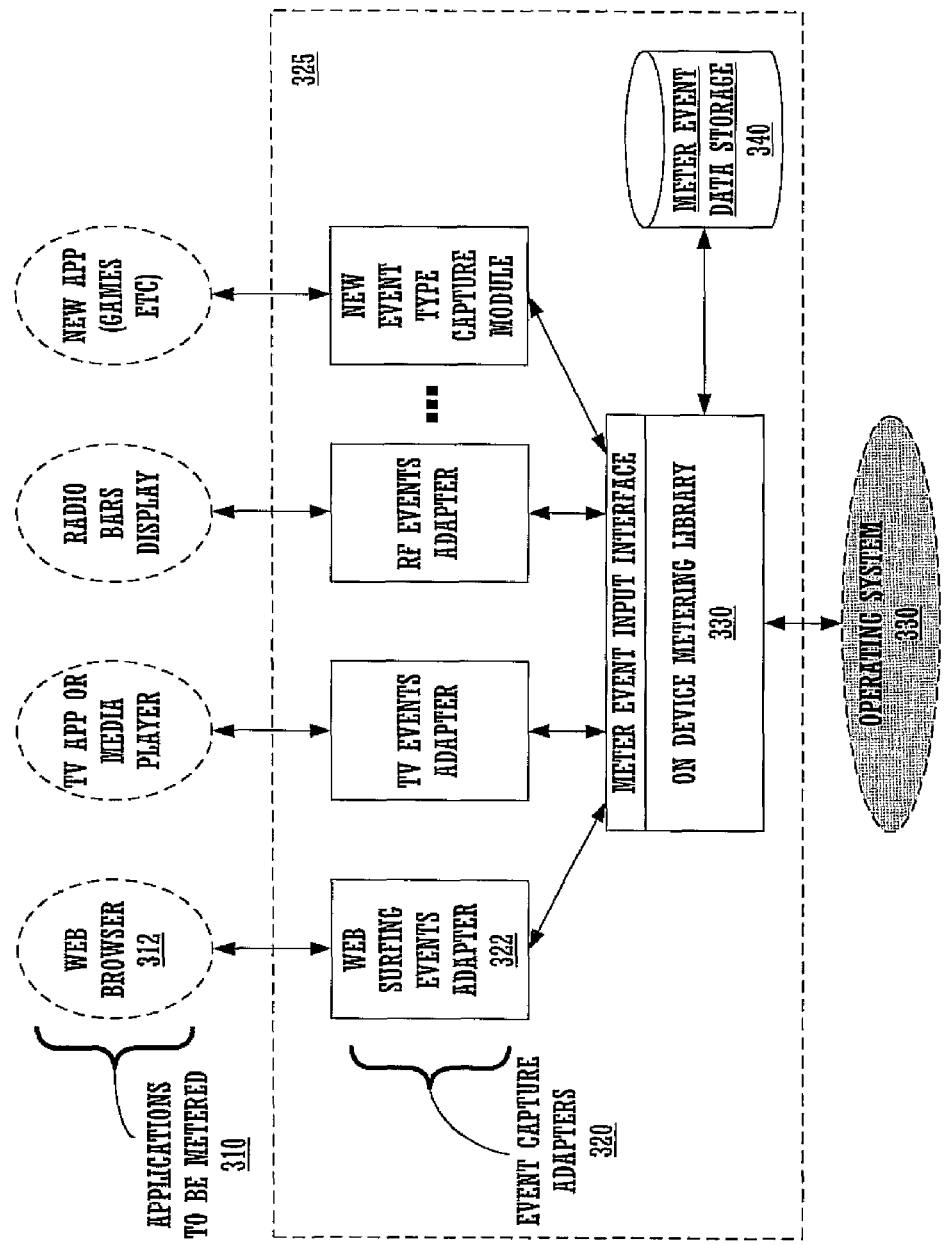
FIG. 3 shows an exemplary on wireless device architecture comprising a metering component in accordance with one embodiment of the present invention.

Referring now to FIG. 3, an exemplary wireless device 300 comprising a metering component 325 in accordance with one embodiment of the present invention is shown. According to one embodiment of the present invention, the wireless device 300 comprises various applications 310. Various applications 310 that operate on the wireless device 300 may be monitored and metered using the metering component 325. The metering component 325 may be used to collect data on various events, such as user interaction with applications, information on the wireless device, performance of the wireless device, etc. In one embodiment, the metering component 325 is a software component that is communicatively coupled to an operating system 350 of the wireless device 300.

Events to be monitored and data to be collected may include user interaction with various applications 310. In this exemplary embodiment, various applications 310 to be monitored may include a web browser application 312, a television application/media player, radio bar display and any new application that may be developed at a later time (e.g., games).

Additional events to be monitored and data to be collected may include information about the wireless device 300. For example, the metering component 325 may monitor and collect information such as wireless device ID, the terminal data collection protocol (TDCP) version, the IMEI, the model, the operating system, the subscriber number, the manufacturer, the metering component version and the like, as described above.

The metering component 325 not only monitors and collects events, but it may also structure the collected data into various events and their respective attributes as described with respect to FIGS. 2A-2K. Once the collected data is structured, it may be stored.

The operation of the metering component 325 for monitoring, collecting, structuring and storing the structured data is described in more detail below. The metering component 325 may comprise a plurality of event capture adapters 320 that are coupled to an on device metering library 330 via a metering event input interface. Moreover, the on device metering library 330 may be further coupled to a metering event data storage 340 and communicatively coupled to the operating system 350 of the wireless device 300.

Each event, e.g., the web browser application 312, may be monitored by its corresponding event capture adapter, e.g., web surfing events adapter 322. The web surfing events adapter 322 monitors and captures events and their corresponding attributes for user interaction with the web browser 312. Accordingly, each event type may have its own corresponding adapter. Each event capture adapter 320 not only monitors but it may also capture and collect each event with its corresponding attributes as described in FIGS. 2A-2K.

Each adapter is further operable to structure the collected data into a tagged hierarchical data structure based on the identified events and their corresponding attributes as described in FIGS. 2A-2K. For example, an event identified by the web surfing events adapter 322 may be the launch of a radio/television application with its corresponding attributes as described in relation to FIG. 2A. Accordingly, the web surfing events adapter 322 may form a tagged hierarchical data structure for the radio/television application with their corresponding attributes as described in FIG. 2A. Similarly, the web surfing events adapter 322 may identify the event as a streaming event as described in FIG. 2B. As such, the web surfing events adapter 322 may form a tagged hierarchical structure for the streaming application with its corresponding attributes as described in FIG. 2B.

According to one embodiment of the present invention, each tagged hierarchical data structure may include separate and independent events where each event may be described by a plurality of attributes. Exemplary events and attributes have been described above. It is appreciated that partitioning tagged hierarchical structure into smaller partitions (e.g., based on events) is advantageous because if part of the metered data (e.g., part of an event) is lost, that event may be ignored without affecting other metered events.

The event capture adapters 320 communicate the tagged hierarchical data structure to the on device metering library 330 via the metering event input interface. The on device metering library 330 may translate the tagged hierarchical data structure into a syntax generic format. The syntax generic format may be an extensible markup language (XML). As a result, syntax generic format of the tagged hierarchical structure contains event specific metered data.

According to one embodiment, the tagged hierarchical data structured as received may be formed into a compact form, e.g., zipped format, a binary-equivalent format, Elias coding, prefix coding and the like. It is appreciated that the binary-equivalent format may comprise a binary extensible markup language (BXML) and abstract syntax notation 1 (ASN.1). Therefore, the tagged hierarchical structure forms a compression friendly scheme with one single central processing unit (CPU) verse instead of multiple CPU passes.

The on device metering library 330 may communicate the tagged hierarchical data structure that is translated into a generic syntax form to the operating system 350. Moreover, the on device metering library 330 may communicate the tagged hierarchical data structure that is translated into a generic syntax form to the metering event data storage unit 340 for storage. Accordingly, the structured data may be stored for later retrieval.

It is appreciated that the tagged hierarchical structure forms a compact structured data by omitting metered data that are redundant. For example, an event may describe when a television application is launched. A second event may describe when the launched television application is terminated. Accordingly, related attributes need not be duplicated for termination of the launched television application since they remain the same. An exemplary code for this example is provided below.

```
<event task_id="2">
    <tv>
    <time time_type="start">2006-07-15T08:14:30.32-05:
        00</time>
    <referrer>http://www.genericsearchengine.com/search-
        .php?hospital</referrer>
    <channel>
        <name>Big Broadcasting Network</name>
        <number>6</number>
        <call_symbol>KBBN</call_symbol>
    <program>
        <title>Intensive Care Emergencies</title>
        <rating>PG-13</rating>
        <description>Hospital Emergency Room Drama</de-
            scription>
        <duration>60 min</duration>
        <start_time>2006-07-15T08:00:00.0-05:00</start-
            _time>
        <end_time>2006-07-15T08:59:00.0-05:00</end-
            _time>
        <meta_ref>http://parameters.com/programs/guide.ph-
            p?idnum</meta_ref>
        <publisher>BBN</publisher>
        <author>John Smith</author>
        <pub_date>2142006</pub_date>
        <copyright>2006 Smith Productions</copyright>
    </program>
    </channel>
    </tv>
</event>
```

Accordingly, when the television application is terminated there is neither a need to duplicate event attributes nor there is a need to duplicate XML attributes that have not changed. Accordingly, the only event attributes that change are identified and all other attributes identified by the XML attribute, event task ID, remain the same. An exemplary code for illustrating termination of the television event is shown below.

```
<event task_id="2">
    <tv>
    <time time_type="end">2006-07-15T08:14:36.32-05:
        00</time>
    </tv>
</event>
```

It is appreciated that the tagged hierarchical structure in a syntax generic format may be transmitted to a central location (e.g., a server) for processing. The processing may include statistical analysis of the amount of time various applications are used, user's habit, device performance and the like.

It is further appreciated that as new applications are developed, a new event type capture module may be developed and added to the metering component 325 without affecting other event adapters. For example, a new event with its corresponding event attributes may be added by software developers in order to capture a new feature of a wireless device without affecting and/or need to change other events and their attributes. In one example, weather measurement features may be a new addition to a wireless device. Accordingly, a new event for measuring weather information along with its attributes can be defined. An exemplary code defining a weather event along with its attributes is shown below.

```
<event>
    <weather>
    <temperature units="F">53</temperature>
    <pressure units="in">29.99</pressure>
    <humidity>78</humidity>
    </weather>
</event>
```

It is further appreciated that the new event may be defined as attributes of existing events. For example, the weather event defined above may be defined as attributes of an existing event, e.g., call. An exemplary code defining the new event weather as attributes of an existing event, call, is shown below.

```
<event>
    <call>
    <weather>
        <temperature units="F">53</temperature>
        <pressure units="in">29.99</pressure>
        <humidity>78</humidity>
    </weather>
    </call>
</event>
```

It is therefore appreciated that metering can be extended to any new application, which may be developed by developing the new event type capture module and without the need to make significant changes to other adapter modules.

Figure 4A:
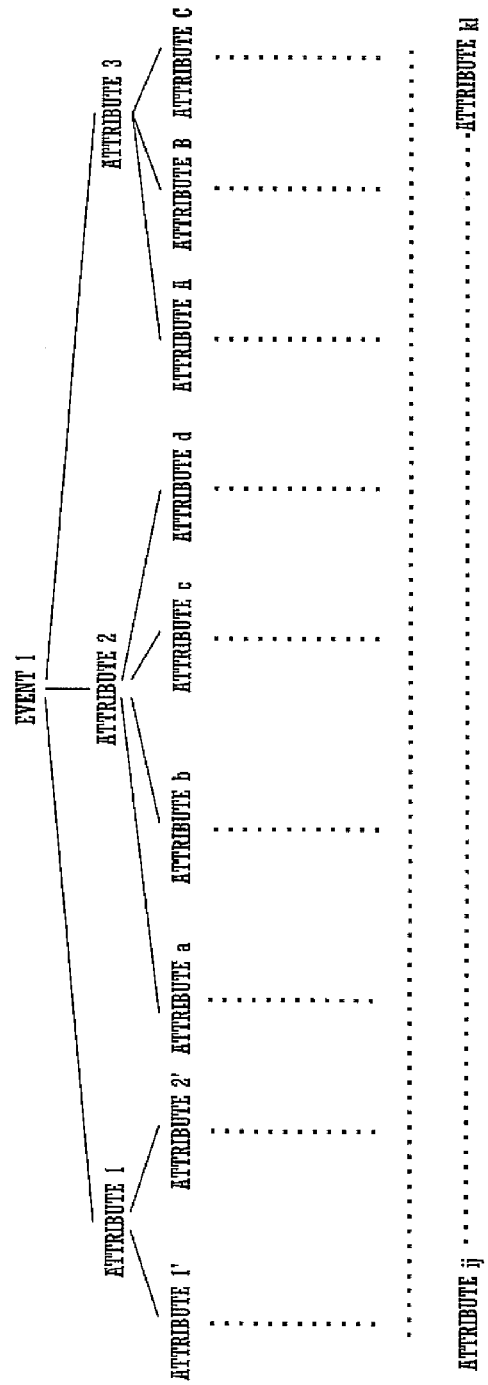
FIGS. 4A and 4B show exemplary representation of data structure stored and hierarchical tree structure formed in accordance with one embodiment of the present invention.

Referring now to FIG. 4A, an exemplary representation of data structure stored and hierarchical tree structure formed in accordance with one embodiment of the present invention is shown. An event as described above may be a highest common denominator to a plurality of attributes. For example, as discussed above an event may be a television application that may be defined by a plurality of attributes. Accordingly, the adapter as described in FIG. 3 places the highest common denominator, e.g., television application, at the highest point in a tree structure node called "Event 1."

As described before, an event may be defined by a plurality of attributes. For example, as described above a television event may be described by the time the television application is launched/terminated, the referrer, the channel, the program and the like. Each of the attributes may be placed as a child of a parent of the "Event 1" node. For example, the time, the referrer and the channel attributes may be designated as "Attribute 1," "Attribute 2" and "Attribute 3" to form a plurality of first attributes.

As described above, each parent attribute may in turn have additional child attributes where each of the parent attributes form a highest common denominator attribute for child attributes. For example, a parent attribute, e.g., "Attribute 1", may have two additional attributes designated as Attribute 1' and Attribute 2'. Similarly, Attribute 2 may have four attributes designated as Attribute a, Attribute b, Attribute c and Attribute d. In the above example, the parent Attribute 2 may be the program attribute as described above. Accordingly, the child attributes may be the title, rating, description, duration, start time, end time, meta reference, publisher, author, publication, copyright and the like of the program attribute. The process may be repeated for all of the associated attributes of "Event 1" in order to complete the representation of the tagged hierarchical tree structure. As such, Attribute$_{ij}$ to Attribute$_{KL}$ form the last row of the child attribute in order to complete the tagged hierarchical tree structure representation for "Event 1". Similar procedure may be repeated for each metered event in order to form the tagged hierarchical structure.

It is therefore appreciated that each attribute has one event that is the highest common denominator among all of the attributes. Moreover, each attribute may have additional associated child/parent attributes. It is further appreciated that the number of attributes, the number of parent attributes and the number of child attributes described herein are exemplary and is not intended to limit the scope of the present invention.

The tagged hierarchical data structure representation may be stored and/or transmitted. It is appreciated that the tagged hierarchical data structure representation described may be either before or after forming a compact, translated structure as described above. Accordingly, the tagged hierarchical data structure representation may be further formed into a compact form and translated into a syntax generic language.

As a result of a tagged structured format, when a new application is developed a new adapter module may be readily added for monitoring the new application since the remaining data structures remain the same regardless of the new application. As such, the tagged data structure is readily extensible to the newly developed application. Moreover, since the monitored and collected user interaction and device performance data are in compact form, the data storage requirement on wireless devices may be reduced. Furthermore, since data is formed in a tagged hierarchical structure format that is compact with reduced amount of redundancy, transmitting data from wireless device to a central location (e.g., a server) can be achieved in a bandwidth efficient manner.

Figure 4B:
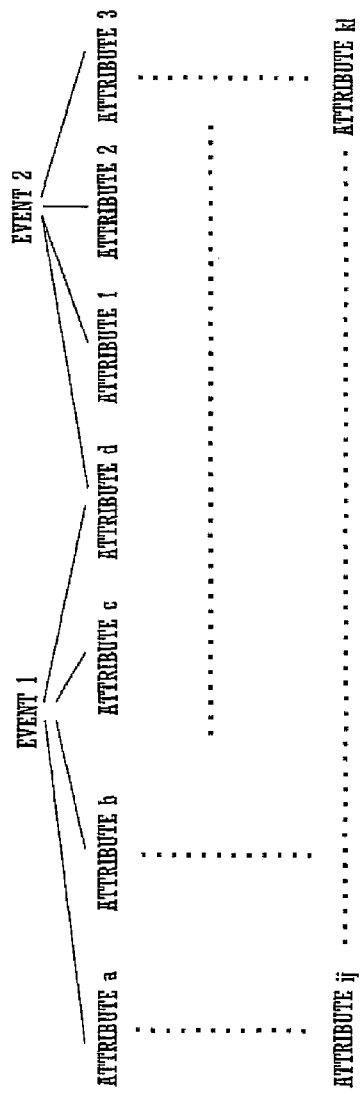

Referring now to FIG. 4B, the tagged hierarchical data structure in a syntax generic language that is in a compact form may be received by a server. The tagged hierarchical data structure comprises a plurality of events and a plurality of attributes that define each event.

The server expands the received tagged hierarchical data structure to form a tree representation for each event. For example, "Event 1" that is the highest denominator for attributes forms the highest node of the tree structure. Attributes related to each event are associated with that event to form a tree structure format. For example, attributes may comprise a plurality of parent attributes and a plurality of child attributes. As described above, any number of parent and child attributes may be used. As such, tree 1 representing "Event 1" may be formed and tree 2 representing "Event 2" may be formed.

According to one embodiment, when various tree structures representing various events are formed, various attributes may be optionally linked together when they have a common feature. For example, "Event 1" may represent launching a television application as described above having various attributes (e.g., attribute a, attribute b, attribute c, attribute d, etc.) that may define the time the television application is launched, the referrer, the channel, the program and the like. A second event, e.g., "Event 2", may represent the termination of the television application as described above having various attributes (e.g., attribute d, attribute 1, attribute 2, attribute 3, etc.) that may define the time the television application is terminated, the referrer, the channel, the program and the like.

However, both events are related to the same application, e.g., television application, where the difference between the two events is that the first event, e.g., "Event 1", represents the launch of the application and that the second event, e.g., "Event 2", represents the termination of the application. Accordingly, the attributes that share a common feature may be linked to each other, thereby reducing the amount of redundant data. For example, attributes such as the referrer, the channel, the program and the like may remain the same and are therefore linked to one another. The linked attribute is represented as "attribute d." However, the attribute that changes from one event to another is the time because one represents the launch time and the other represents the termination of the television application.

It is appreciated that any number of attributes may share a common feature. As such, the number of attributes sharing a common feature is not intended to limit the scope of the present invention. Moreover, it is appreciated that linking attributes may be defined in a manner other than having common features. As such, the manner of linking various attributes is exemplary and it is not intended to limit the scope of the present invention. Accordingly, the received tagged hierarchical data structure may be expanded into separate tree structures or an intertwined tree structure with some linkage between different attributes.

The expanded hierarchical tree structure may be stored and/or displayed. In one example, the expanded hierarchical tree structure may be processed for statistical analysis.

Referring now to FIG. 5A, an exemplary data analysis of the metered data in accordance with one embodiment of the present invention is shown. In this example, the percentage usage of various events, e.g., applications, is processed and displayed as a bar graph. For example, the processing of the tagged hierarchical data structure indicates that a user used a television application 7% of the time, a radio application 12% of the time, streaming media application 10% of the time, SMS application 2% of the time, email application 5% of the time and the like.

Figure 5B:
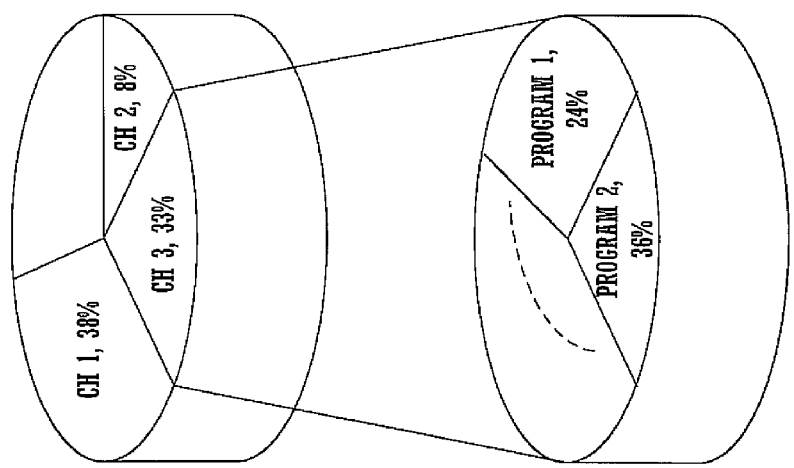

Referring now to FIG. 5B, each of the events processed may be further processed to result in additional statistical data. For example, further processing of television application may indicate that the user watched channel 1 38% of the time, channel 2 8% of the time, channel 3 33% of the time and the like. The processing may further provide statistical analysis as to the percentage of the time various programs were watched. For example, on channel 3, program 1 was watched 24% of the time, program 2 was watched 36% of the time, etc.

It is appreciated that the processing of tagged hierarchical data structure described herein is exemplary and it is not intended to limit the scope of the present invention. For example, the processing of tagged hierarchical data structure may be for performance of a wireless device by processing signal strength, signal interference, quality of the call and the like. Accordingly, processing tagged hierarchical data structure provides manufacturers, content providers, application developers, etc. visibility to the market needs and visibility to the performance of various applications and components of a wireless device such that remedial action can be taken if needed.

Figure 6A:
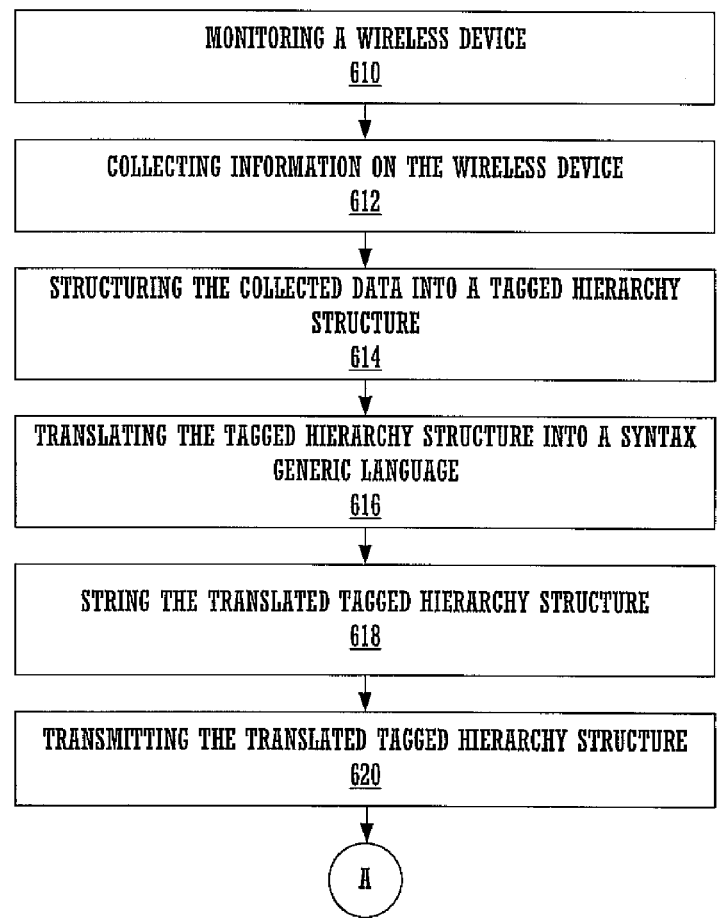
FIGS. 6A and 6B show an exemplary flow diagram for structuring and expanding metered data in accordance with one embodiment of the present invention.

Referring now to FIG. 6A, an exemplary flow diagram 600 for structuring and expanding metered data in accordance with one embodiment of the present invention is shown. At step 610, a metering component may monitor user interaction and the performance of the wireless device. The metering component may comprise a plurality of event adapters that monitors user interaction and the performance of the wireless device. At step 612, the event adapters may collect the monitored data. At step 614, the event adapters or other similar component may structure the collected monitored data into a tagged hierarchical data structure as described above. At step 616, the collected data in the tagged hierarchical data structure, is translated into a syntax generic language, e.g., extensible markup language (XML). It is appreciated that the translation may be done before structuring the collected data into the tagged hierarchical data structure.

It is appreciated that the tagged hierarchical data structure is in a compact form. Moreover, it is appreciated that the size of data may be further reduced by using a zip format, binary-equivalent format, Elias coding, prefix coding and the like. The binary-equivalent format may comprise binary extensible markup language (BXML), abstract syntax notation 1 (ASN.1) and the like.

At step 618, the translated tagged hierarchical structure may be stored in a memory component, e.g., meter event data. At step 620, the collected data in a translated tagged hierarchical structure may be transmitted to a central unit, e.g., a server, for further processing. It is appreciated that due to the tagged hierarchical structure if one event is corrupted the remaining events are unaffected and collected information are preserved.

It is further appreciated that in order to protect the privacy of the wireless device user, an authentication method to securely transmit the collected data may optionally be employed. For example a Secure Socket Layer (SSL), Transport Layer Security (TLS) and the like, may be utilized to authenticate the identity of the server that is scheduled to receive the collected data and to authenticate the identity of the wireless device that collected the data. It is appreciated that SSL, TLS and the like may be used to detect tampering with the collected data by using a trusted third party. The trusted third party may provide certificates for use in data integrity and protection methods. One exemplary trusted third party may be a certification authority (CA). As a result, collected data is protected against being forged, accessed and/or modified by unauthorized party during transmission.

Figure 6B:
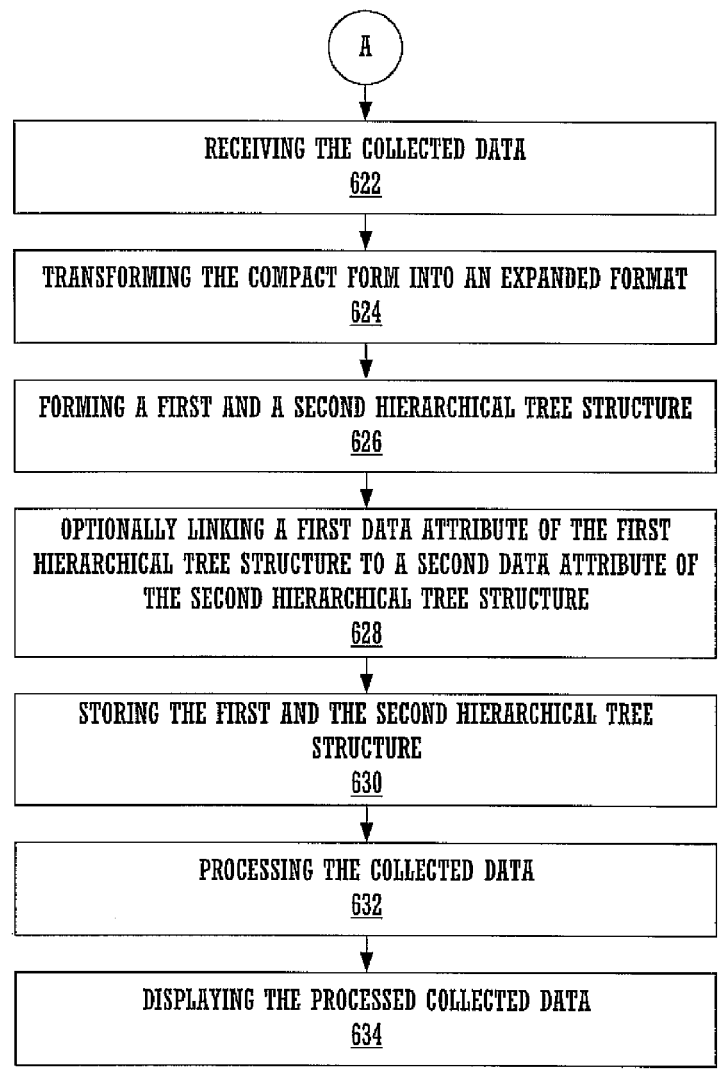

Referring now to FIG. 6B, at step 622 the collected data is received. The collected data is received in a tagged hierarchical structure that is in a syntax generic language. As described above, the tagged hierarchical structure may be in a compact form, e.g., zipped, binary-equivalent format, Elias coding, prefix coding and the like. As such, at step 624, the compact form is transformed into an expanded form. Moreover, at step 626 a first and a second hierarchical tree structures are formed. It is appreciated that even though only two events and two hierarchical tree structures are described herein, any number of events and tree structures may be formed. Accordingly, the number of events and tree structures are exemplary and not intended to limit the scope of the present invention.

At step 628, a first and a second attribute of a first and a second event may be optionally linked to one another based on a common feature. However, it is appreciated that any number of attributes of various events may be linked based on any criteria and not just a common feature. As such, the number of attributes and the criteria for linking different attributes are exemplary and not intended to limit the scope of the present invention.

At step 630, the first and the second hierarchical tree structures may be stored. At step 632, the hierarchical tree structures may be processed for statistical analysis as described above. According to one embodiment, at step 634 the result of the statistical analysis may be displayed, printed, transmitted or stored, to name a few.

Figure 7:
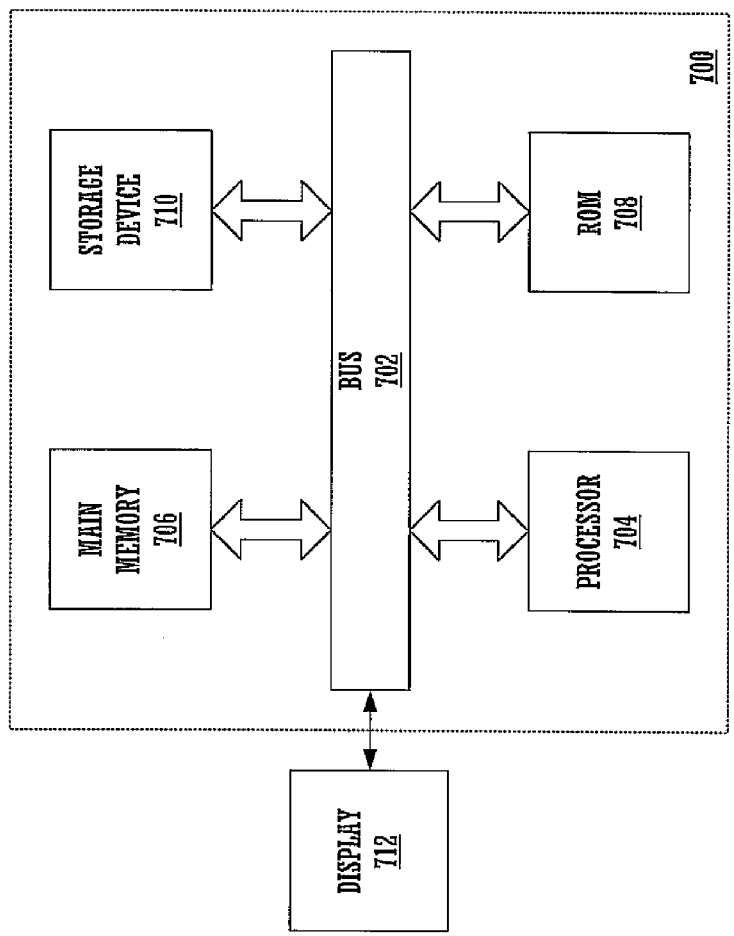
FIG. 7 illustrates a general purpose computer system that may serve as a platform for embodiments of the present invention.

FIG. 7 is a block diagram that illustrates a computer system 700 upon which an embodiment of the invention may be implemented. Computer system 700 may implement the process for structuring and expanding metered data in accordance with one embodiment of the present invention is shown as shown in FIGS. 1-6 and includes a bus 702 or other communication mechanism for communicating information, and a processor 704 coupled with bus 702 for processing information.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A non-volatile storage device 710, such as flash memory, a magnetic disk or optical disk, is provided and coupled to bus 702 for storing information and instructions and may store the persistent internal queue. According to one embodiment, the instructions for implementing the virtual device may be stored on any one of the memory components (e.g., RAM, ROM, non-volatile storage device, etc.). Computer system 700 may be coupled via bus 702 to an optional display 712, such as a liquid crystal display (LCD), for displaying information to a computer user.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of storing collected data on a wireless device comprising:
    monitoring user interaction with the wireless device;
    collecting data related to the user interaction;
    structuring the collected data into a tagged hierarchy structure comprising a plurality of separate and independent events, wherein each event comprising a plurality of data attributes describes an application specific occurrence, and wherein the structuring is operable to reduce the amount of redundant data to form a compact structured data;
    translating the tagged hierarchy structure into a syntax generic language, wherein the syntax generic language contains event specific content; and
    storing the translated tagged hierarchy structure.

2. The method as described in claim 1, wherein the plurality of data attributes comprise the application name, the application type, the time application was launched, the application description, the time the application was terminated, the physical location where the application was launched and the application payload.

3. The method as described in claim 1 further comprising:
    collecting device specific information comprising the model number, the manufacturer, the operating system, the subscriber number, the version number and the device identification number.

4. The method as described in claim 1 further comprising:
    collecting information regarding a performance of the wireless device, wherein the performance parameters include signal strength, signal interference, signal quality, dropped calls, the speed of download/upload, amount of detected error, available memory capacity on the wireless device and available power on the wireless device.

5. The method as described in claim 1, wherein the compact structure is selected from a group consisting of a zipped format, Elias coding, prefix coding and a binary-equivalent format.

6. The method as described in claim 5, wherein the binary-equivalent format is selected from a group consisting of binary extensible markup language (BXML) and abstract syntax notation 1 (ASN.1).

7. The method as described in claim 1 further comprising:
    encrypting the translated tagged hierarchy structure; and
    authenticating the identity of a recipient of the encrypted translated tagged hierarchy structure prior to transmitting the encrypted translated tagged hierarchy structure.

8. The method as described in claim 1 further comprising:
    transmitting the translated tagged hierarchy structure.

9. The method as described in claim 1, wherein the syntax generic language is an extensible markup language (XML).

10. The method as described in claim 1, wherein the collecting is via a metering software operating on the wireless device.

11. A computer-readable medium that is at least one of a memory device or a storage disk comprising instructions that, when executed, cause a machine to at least:
    monitor user interaction with a wireless device;
    collect data related to the user interaction;
    structure the collected data into a tagged hierarchy structure comprising a plurality of separate and independent events, wherein each event comprising a plurality of data attributes describes an application specific occurrence, and wherein the structuring is operable to reduce the amount of redundant data to form a compact structured data;
    translate the tagged hierarchy structure into a syntax generic language, wherein the syntax generic language contains event specific content; and
    store the translated tagged hierarchy structure.

12. The computer-readable medium as described in claim 11, wherein the plurality of data attributes comprise the application name, the application type, the time application was launched, the application description, the time the application was terminated, the physical location where the application was launched and the application payload.

13. The computer-readable medium as described in claim 11 wherein the instructions further cause the machine to:
    collect device specific information comprising the model number, the manufacturer, the operating system, the subscriber number, the version number and the device identification number.

14. The computer-readable medium as described in claim 11 wherein the instructions further cause the machine to:
    collect information regarding a performance of the wireless device, wherein the performance parameters include signal strength, signal interference, signal quality, dropped calls, the speed of download/upload, amount of detected error, available memory capacity on the wireless device and available power on the wireless device.

15. The computer-readable medium as described in claim 11, wherein the compact structure is selected from a group consisting of a zipped format, Elias coding, prefix coding and a binary-equivalent format.

16. The computer-readable medium as described in claim 15, wherein the binary-equivalent format is selected from a group consisting of binary extensible markup language (BXML) and abstract syntax notation 1 (ASN.1).

17. The computer-readable medium as described in claim 11 wherein the instructions further cause the machine to:
    encrypt the translated tagged hierarchy structure; and
    authenticate the identity of a recipient of the encrypted translated tagged hierarchy structure prior to transmitting the encrypted translated tagged hierarchy structure.

18. The computer-readable medium as described in claim 11 wherein the instructions further cause the machine to:
    transmit the translated tagged hierarchy structure.

19. The computer-readable medium as described in claim 11, wherein the syntax generic language is an extensible markup language (XML).

20. The computer-readable medium as described in claim 11, wherein the collecting is via a metering software operating on the wireless device.

* * * * *